May 1, 1951　　　　J. THOMSON　　　　2,551,513
CONVEYER FRAME
Filed Oct. 22, 1947　　　　　　　　2 Sheets-Sheet 1
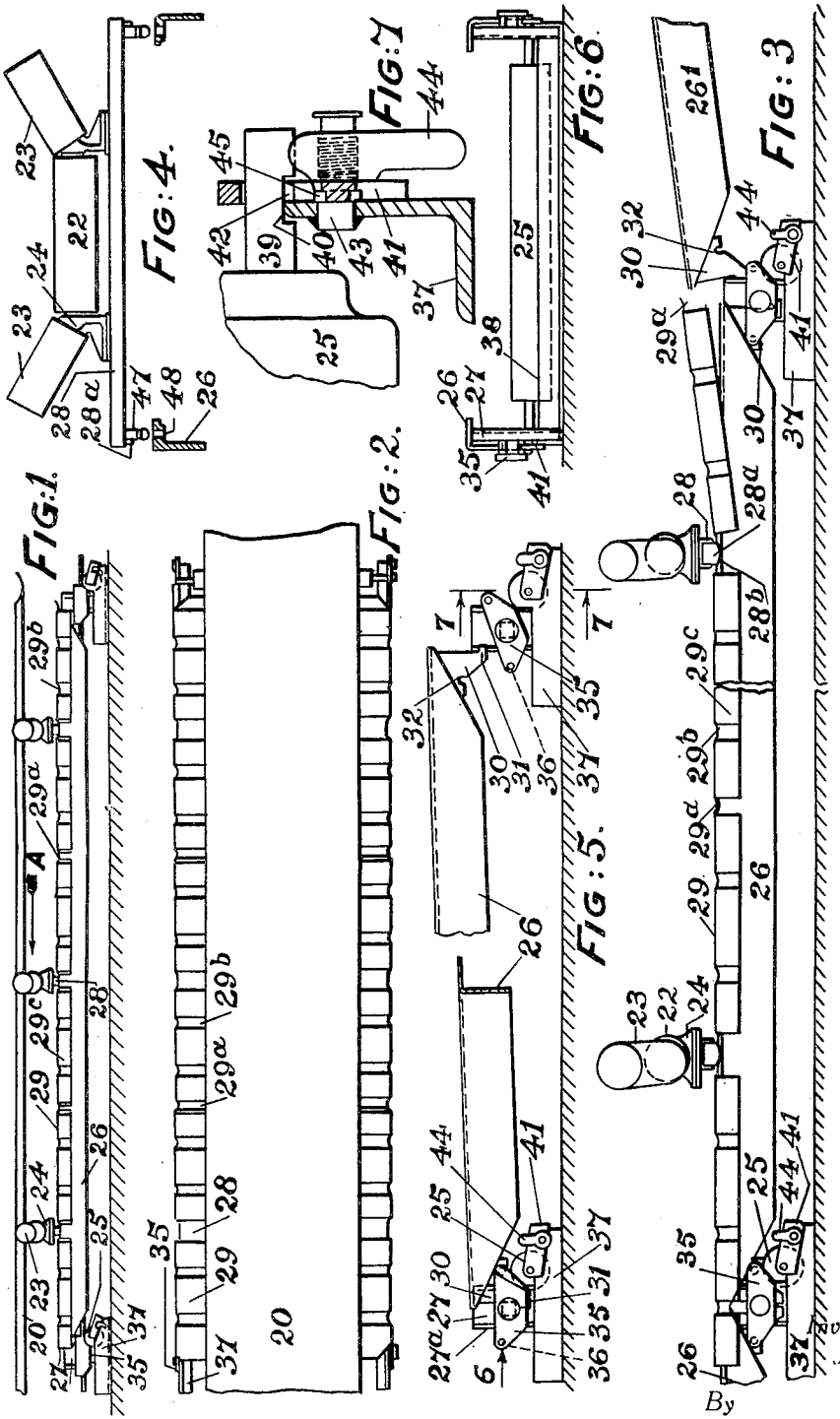
Inventor:
JAMES THOMSON
By
Richardson, David and Nixon
Attorneys.

May 1, 1951 J. THOMSON 2,551,513
CONVEYER FRAME
Filed Oct. 22, 1947 2 Sheets-Sheet 2
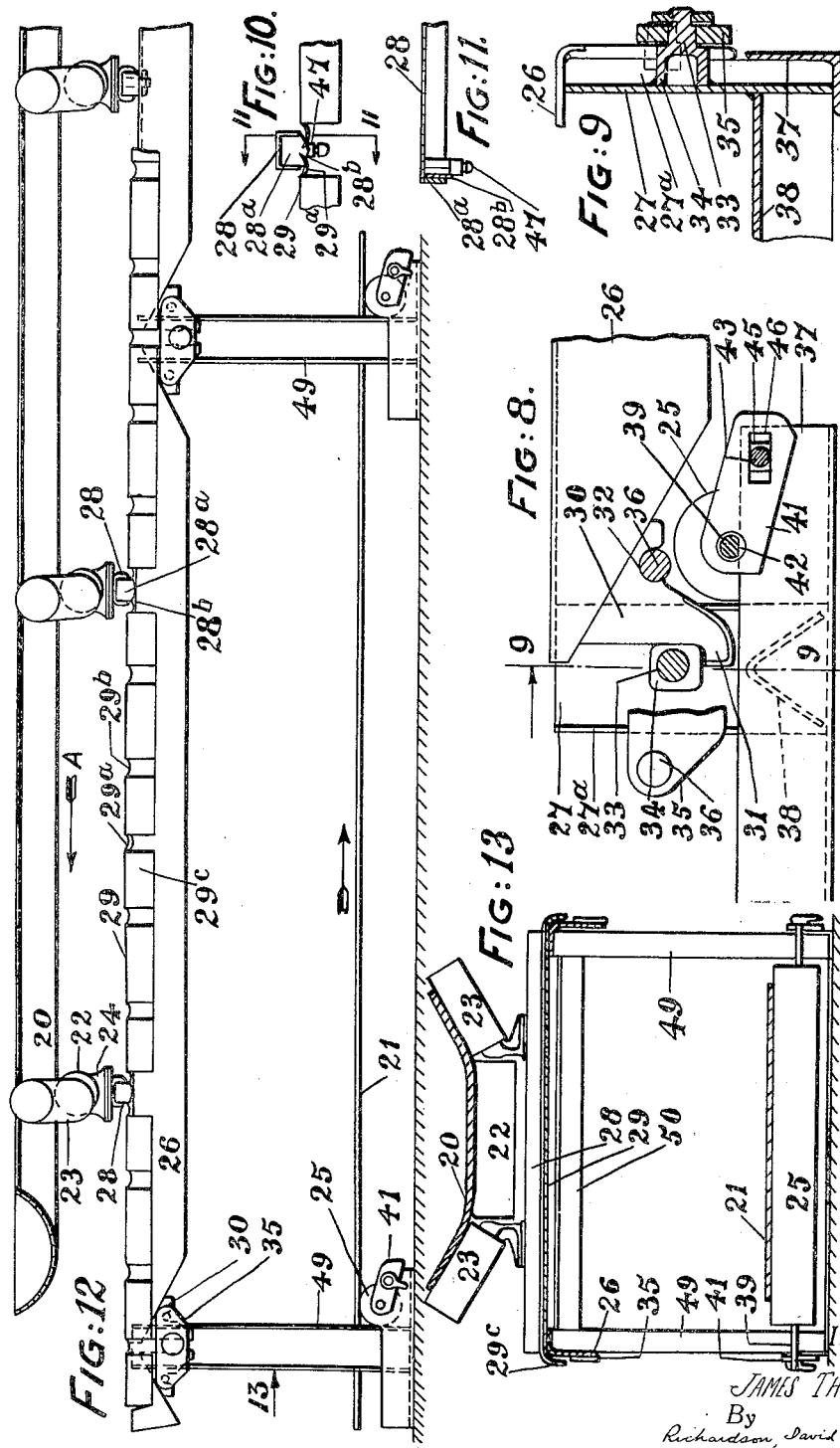
Inventor:
JAMES THOMSON
By Richardson, David and Verdon
Attorneys

UNITED STATES PATENT OFFICE 2,551,513

CONVEYER FRAME

James Thomson, Glasgow, Scotland, assignor to Mavor & Coulson, Limited, Glasgow, Scotland Application October 22, 1947, Serial No. 781,393
In Great Britain September 18, 1946

5 Claims. (Cl. 198—204)

This invention relates to a conveyer frame for loose materials, more especially, but not exclusively, for conveying coal in coal mines from the mine workings.

In particular, the invention relates to conveyors of the type comprising an endless belt which travels over idler rollers rotatable in bearings provided on a long supporting structure. In conveyors of the type stated, it is customary to have a structure of sectional construction; that is to say, the structure is composed of sections, or unit lengths, which are joined together end to end, the arrangement being such that the conveyor can be extended in length by incorporating more sections in the supporting structure and lengthening the belt.

The object of this invention is to provide a sectional-construction conveyor of the type stated which will be more easily transported, erected, extended and dismantled than hitherto possible.

The invention comprises a sectional-construction conveyor of the type stated in which a section includes a longitudinal component that is connected to a terminal stool component by means of a projection on one of said components fitting into the other of said components, the arrangement being such that the connection is made or broken by entering or withdrawing said projection and also being such that when the connection is made said projection prevents lifting movement and endwise movement of each component relative to the other at the place of connection. An advantage of such a supporting structure is that the work of erecting, extending and dismantling can be done without use of tools.

The stool component may include a rocker constructed to receive the projection on the longitudinal component, the rocker being pivotal in case of need when a longitudinal is being connected to it or disconnected from it.

The invention also comprises a sectional-construction conveyor in which a section includes a longitudinal component and a terminal stool component that are inter-connectible and in which the stool component has a rocker and parts that engage a projection on the longitudinal inserted between them in order to connect the longitudinal to the stool. The projection may have a nose that engages below a part on the stool and a recess that engages on a part on the rocker.

Preferably, each section of the conveyor structure is composed of components all of which can be interconnected and disconnected without use of tools and which, when disconnected, can be packed or assembled as a compact group adapted to be transported say by use of a wheeled mine vehicle, or even by use of a conveyor to be extended, to the place where these parts are to be erected.

The invention is applicable to conveyors whose structure incorporates decking as a cover for the return lower run of the belt and the return idlers over which it travels. In such a conveyor to which the invention is applied, the decking may consist of cover plates arranged end to end and formed with downturned flanges which fit over a pair of the longitudinal components extending from one terminal stool to another; and so-called idler boards may be located between certain of said cover plates and may have projections fitting through said longitudinal components.

The invention will now be described by way of example with reference to the accompanying drawings, in which:

Fig. 1 is an elevation of a portion of a sectional conveyor embodying the invention, and Fig. 2 is a corresponding plan. Fig. 3 is an elevation of parts of the conveyor according to Figs. 1 and 2, Fig. 3 being drawn to a larger scale and showing some of the parts displaced from their normal position. Fig. 4 is a sectional end view showing parts of the conveyor separated from one another. Fig. 5 is an elevation of parts of the conveyor, some of the parts being displaced from their normal position. Fig. 6 is an end elevation in the direction of the arrow 6, Fig. 5. Fig. 7 is a sectional detail approximately on the line 7—7 of Fig. 5, being drawn to a still larger scale. Fig. 8 is an enlarged fragmentary view of parts already shown at the left hand end of Fig. 5, and Fig. 9 is a section on the line 9—9 of Fig. 8. Fig. 10 is a fragmentary view showing to a larger scale parts already shown in Fig. 3. Fig. 11 is a section on the line 11—11 of Fig. 10. Fig. 12 is an elevation of a modified construction of the conveyor, and Fig. 13 is a sectional elevation, the view being in the direction of the arrow 13 in Fig. 12.

Referring to Figs. 1 to 11 of the drawings, the conveyor therein shown is designed for conveying coal in coal mines and comprises an endless belt 20, 21, the upper or conveying run 20 of which travels over sets of three idler rollers 22, 23 that are rotatable on bearing brackets 24 (Fig. 4). Each set of these rollers are arranged in known manner to curve the belt in the upper run into trough formation (see for instance the belt 20 shown in Fig. 13). The lower or return run 21 of the belt travels over single idler rollers 25, the supporting means for which is described hereinafter. The various idler rollers are provided at intervals throughout a long supporting structure, which is of sectional construction. Each section is a unit consisting of various parts which can be interconnected and disconnected without need for the use of the tools. The main parts of which each sectional unit consists are the following: a pair of side longitudinals 26; a double-sized stool including side-blocks 27; a number of transverse bearers provided as idler boards 28; decking covers 29.

Each of the pair of side longitudinals 26 is of angle-section, having a deep vertical flange and a top inturned flange. These longitudinals extend throughout the length of a section (which may be about twelve feet). Each of the two ends of a longitudinal is supported by a stool, which is double-sided, being constructed at opposite sides for connection to the ends of the longitudinals of two adjoining sections. Figs. 1, 2 and 5 show a single section with a stool at each end. Each end of the vertical flanges of the longitudinals has a projection 30 cut to a special shape, namely, with a long downward portion which terminates in a short nose 31 and has a semi-circular recess 32 on its underside. Each stool includes two side blocks 27 in the form of vertical channels with out-turned side flanges 27a, and each of these blocks has a journal pin 33 that has a square boss 34 and serves as a bearing for one of two side rockers 35. Each of these rockers has two transverse members formed as end pins 36.

When a longitudinal (say the right hand longitudinal 26¹ in Fig. 3) is being connected to an already engaged stool (say the right hand stool in Fig. 3) the manipulation involves an up-tilting motion of the longitudinal. When the longitudinal 26¹ is lowered to its proper setting, the projection 30 snugly fits into the stool, as Fig. 8 shows. As shown, the appropriate projection 30 is entered through the space between the corresponding end pin 36 and the journal pin 33 of the associated block 27, the nose 31 engaging below the square boss 34 of the journal pin and the appropriate recess 32 engaging the end pin 36.

On the other hand, when one end of a longitudinal (say the left hand end of the longitudinal in Fig. 5) is already engaged in a stool, the manipulation of the components involves a pivotal motion of the rocker to be engaged (say the right hand rocker in Fig. 5, which is shown tilted to receive the associated projection 30).

The arrangement is such that a longitudinal, when connected to a stool, cannot be pulled endwise or lifted from the stool because of the engagement of the projection 30 between the end pin 36 and the journal pin 33 and the engagement of the nose 31 below the boss 34. Moreover, the longitudinal cannot twist sidewise because of the engagement of the projection 30 between the end pin and the journal pin. Moreover, when a rocker is engaged by two longitudinals, it is locked rigidly by the projections 30 against tilting.

Thus, it will be clear that in a sectional-construction conveyor according to the example, it is the rockers 35 which lock adjoining longitudinals 26 rigidly together.

When a rocker is engaged by only one longitudinal, if one desires to lock the rocker against tilting one must use any appropriate external means for the purpose.

In the example, each stool is a transverse assembly fabricated of parts welded together. These parts include end angle bars 37 to which the previously mentioned bearing blocks 27 are welded. Said parts also include a central transverse gable-form member 38 which extends from side to side of the stool, being welded to the blocks 27.

Each stool also carries one of the idler rollers 25 on which the lower run of the belt travels. Each idler roller is journalled on a stationary axle 39 that is supported by the angle bars 37, the underside of the axle near each end having a recess 40 (see Fig. 7) which is seated on the adjacent bar. The recess serves to position the axle in a direction transverse to the conveyor. The axle is adjustably positioned lengthwise of the conveyor by a pair of arms 41, each adjustably attached to one of the angle bars 37. The axle at each end projects through a hole 42 in the adjacent arm, so that if the arm is adjusted lengthwise of the conveyor the axle and the idler roller are adjusted correspondingly. The means of attachment between each of the arms and the adjacent angle bar comprises a screw-threaded stud 43 that is welded to the bar 37 and has a captive pot nut 44, the stud having a square body 45 which extends slidably through a slot 46 in the arm 41 (see also Fig. 8). In order to make an adjustment, a worker slackens the pot nuts at both sides of the conveyor, moves the arms appropriately and tightens the pot nuts again.

In the example according to Figs. 1 to 11, each pair of longitudinals 26 supports three idler boards 28. Each of these idler boards 28 is a transverse bearer of inverted channel section (see Figs. 3, 10 and 11). Each bearer is secured to the pair of longitudinals by having near each end a downwardly projecting pin or tongue 47 which is a neat fit in a hole or slot 48 in the top flange of the appropriate longitudinal 26 (see Fig. 4). Each end of the bearers 28 is closed by a plate 28a which is formed with a convexly curved bottom side 28b that rests upon the top flange of the associated longitudinal 26 (see Fig. 3). By virtue of the curved sides 28b and slight looseness between the pins 47 and holes 48, the bearers 28 have limited freedom to cant upon the longitudinals 26, and so there is no tendency for them to lever themselves (under say a horizontal blow) out of connection with the longitudinals. The canting of the bearers 28 will be in the forward direction (namely, the direction in which the upper run 20 travels, as indicated by the arrow A, Fig. 1). The bearings 24 on which the idler rollers 22, 23 are journalled will also cant forwards with the bearers 28, such canting being desirable in order to incline forwardly the side rollers 23, as shown in Figs. 1 and 3, and thus cause them to impart a centralising action to the upper run 20 of the belt. In order to set the three bearers in place on a pair of longitudinals, a worker enters the pins 47 in the appropriate holes 48 and lowers the bearers upon the longitudinals 26.

In the example, decking for the lower run consists of a number of covers 29 which fit on the longitudinals 26 and engage either end to end against one another or against one of the idler boards 28. Each cover terminates at each end in a curved projection 29a. In the case of two covers that meet end to end, the adjacent projections 29a interengage, the one overlapping the other and forming therewith an adequate joint and closure. In the case of a cover that comes against an idler board 28, the adjacent projection 29a in effect hooks below the adjoining downturned flange of the board (see Fig. 10). Each cover is a lightpressed plate, formed with transverse corrugations 29b to strengthen it and with rounded downturned side flanges 29c which fit over the longitudinals. These covers need no means of connection to the longitudinals.

The previously mentioned gable-form member 38 is formed in this manner as a precaution; in the event that the workers omit the associated return idler 25, the lower run 21 of the belt travels upon the gable-form member instead without being materially damaged.

It will be manifest that if a conveyor has to be extended by the addition of a section the following components must be added, viz: a pair of longitudinals 26 for connection to the already fitted terminal stool 27, 35, 38 of the conveyor; another terminal stool with its return idler 25; three idler boards 28 each with a set of three troughing idlers 22, 23, each board to be fitted upon and across the longitudinals 26; a set of cover plates 29 to deck the structure from end to end.

These components are erected without any need whatsoever for the use of tools, no bolts or the like being involved in the connections.

Moreover, adjustment of the return idler 25 is performed without the use of tools, the pot nuts 44 being turnable by hand or by striking them with any convenient object.

The components of a section can be readily assembled loose for transport by arranging the longitudinals as bottom carriers, piling the cover plates upon the longitudinals and placing the stool and idler boards upon the pile of cover plates.

Referring now to the modification according to Figs. 12 and 13, this construction differs from the construction already described herein in that the upper run 20 of the conveyor is arranged at a much higher level in order to leave the lower run 21 free from obstruction so that it also can be used for the conveyance of material. As shown, each of the terminal stools has channel section legs 49 interconnected near their top ends by a stay 50. These legs at their top ends support longitudinals 26 and carry rockers 35 and at their bottom ends carry an idler axle 39 and adjustment arms 41 in the same way as the much shorter side-blocks 27 in the previously described construction. In both constructions, the same reference characters are used to denote parts which are similar.

I claim:

1. A sectional-construction conveyor of the type stated including rollers to support the conveyor belt, in which a conveyor section comprises a pair of side longitudinals, transverse bearers to inter-connect said longitudinals and support said rollers, a terminal stool, a rocker pivotally mounted on said stool, and end projections on said longitudinals to engage with said rocker and connect the longitudinals to the stool, said rocker being pivotable in relation to said stool when required to effect connection or disconnection between the longitudinals and the stool.

2. A sectional-construction conveyor of the type stated including rollers to support the conveyor belt, in which a conveyor frame section comprises a pair of side longitudinals, transverse bearers to inter-connect said longitudinals and support said rollers, a terminal stool, a rocker, bearing parts which pivotally connect said rocker to said stool at opposite sides of the conveyor, a transverse member at an end of said rocker, projections extending endwise from said longitudinals so as to be engageable below said bearing parts and above said transverse member in order to connect the longitudinals to the stool, said rocker being pivotable in relation to said stool when required to effect insertion or withdrawal of said projections in relation to the rocker.

3. A sectional-construction conveyor according to claim 2 in which the projections extending from said longitudinals each have a nose that projects below one of said bearing parts and each also have a recess that seats upon said transverse member.

4. A sectional-construction conveyor of the type stated including upper and lower rollers to support upper and lower runs of the conveyor belt, in which a conveyor section comprises a pair of side longitudinals, transverse bearers inter-connecting said longitudinals at spaced intervals and supporting said upper rollers, a terminal stool, a rocker pivotally mounted on said stool, end projections on said longitudinals engaging with said rocker and connecting the longitudinals to the stool, said rocker being pivotable in relation to said stool when required to effect connection or disconnection between the longitudinals and the stool, supports for one of said lower rollers on said stool, and plates with downturned side flanges covering the lower conveyor run that is supported by the lower rollers, said plates being arranged end-to-end on said longitudinals and filling the spaces between the upper-roller bearers.

5. A sectional-construction conveyor of the type stated including rollers to support the conveyor belt, in which the conveyor sections comprise pairs of side longitudinals, the longitudinals at each side being aligned end to end, transverse bearers inter-connecting said longitudinals and supporting said rollers, terminal stools between adjacent pairs of said longitudinals, double-ended rockers pivotally mounted on said stools, there being one double-ended rocker per stool, and projections on said longitudinals engaging with opposite ends of said rockers in order to connect the longitudinals to the stools, each rocker being engaged by the adjacent ends of two pairs of said longitudinals, and being pivotable in relation to its stool when required to effect connection or disconnection between adjacent longitudinals and the stool.

JAMES THOMSON.

REFERENCES CITED

The following references are of record in the file of this patent:

UNITED STATES PATENTS

| Number | Name | Date |
|---|---|---|
| 2,101,017 | Bebinger | Dec. 7, 1937 |
| 2,147,908 | Madeira | Feb. 21, 1939 |
| 2,277,402 | Hoeck | Mar. 24, 1942 |

FOREIGN PATENTS

| Number | Country | Date |
|---|---|---|
| 429,336 | Great Britain | Dec. 7, 1934 |
| 828,438 | France | Jan. 25, 1937 |